United States Patent [19]

Rumler

[11] Patent Number: 4,900,942
[45] Date of Patent: Feb. 13, 1990

[54] FABRIC PILE LAY DETECTOR USING MIRROR SYSTEM WITH MEANS TO ROTATE 360 DEGREES

[75] Inventor: Joseph E. Rumler, Greenville, S.C.

[73] Assignee: Milliken Research Corporation, Spartanburg, S.C.

[21] Appl. No.: 154,413

[22] Filed: Feb. 10, 1988

[51] Int. Cl.$^4$ ............................................. G01N 21/88
[52] U.S. Cl. ..................................... 250/572; 356/430
[58] Field of Search ................... 250/223 R, 239, 571, 250/572; 356/237, 429–431

[56] References Cited

U.S. PATENT DOCUMENTS

| | | | |
|---|---|---|---|
| 4,338,032 | 7/1982 | Bardsley et al. | 356/431 |
| 4,389,575 | 6/1983 | Cole | 356/430 |
| 4,414,476 | 11/1983 | Maddox et al. | 250/572 |
| 4,454,419 | 6/1984 | Peter, III et al. | 250/223 R |
| 4,500,208 | 2/1985 | Sick | 250/572 |
| 4,656,360 | 4/1987 | Maddox et al. | 250/571 |
| 4,702,597 | 10/1987 | Sollars, Jr. | 250/572 |

Primary Examiner—David C. Nelms
Assistant Examiner—Stephone B. Allen
Attorney, Agent, or Firm—Earle R. Marden; H. William Petry

[57] ABSTRACT

A system to detect the angle of pile lay of the fibers on the face side of a pile fabric by scanning the fibers with an infra red light source and measuring the intensity of the reflected infra red light beam. This is accomplished by using a rotating mirror system to deflect the infra red light beam onto the fabric and direct the infra red light beam reflected from the pile fibers on the fabric to a detector.

20 Claims, 3 Drawing Sheets

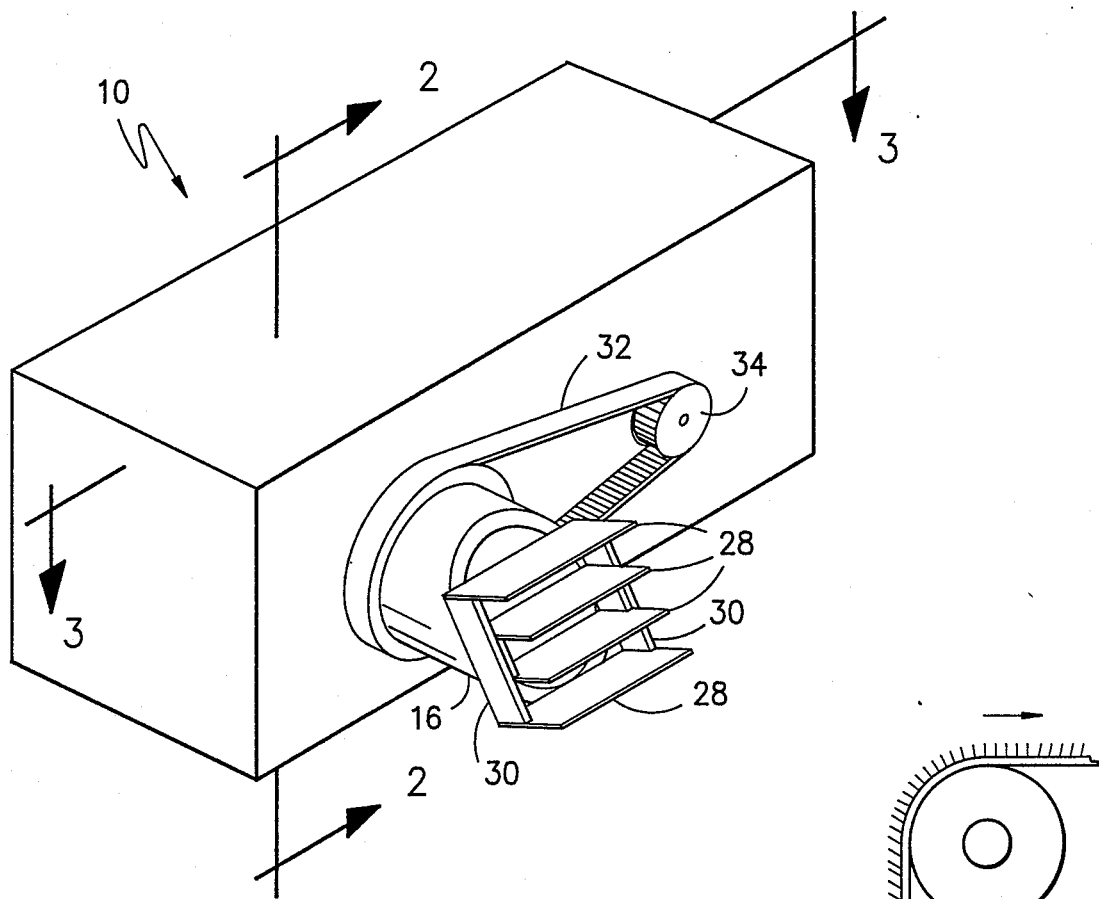
FIG. -1-
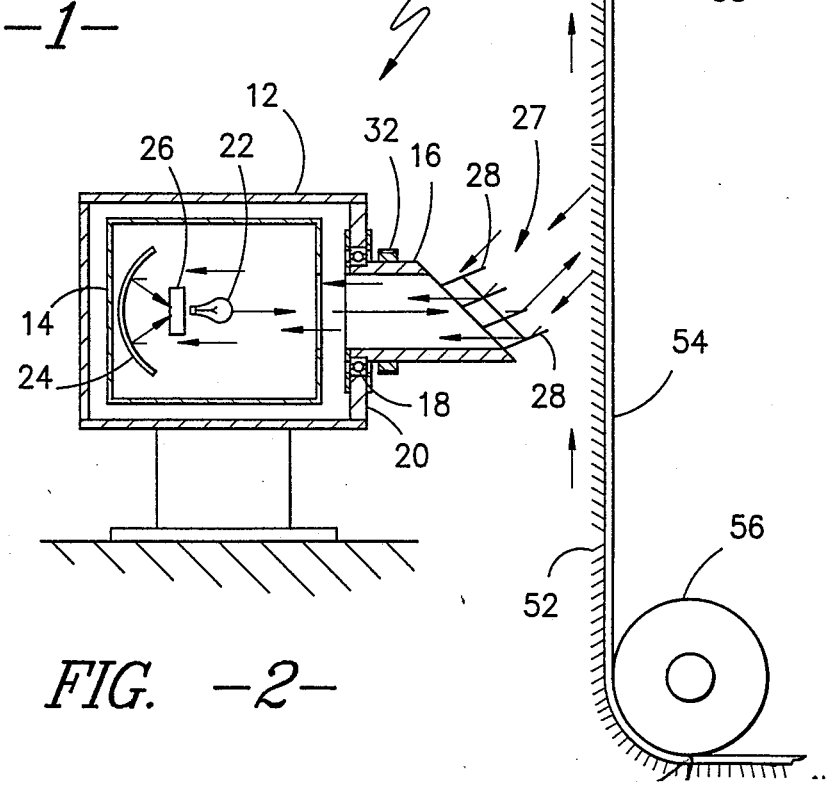
FIG. -2-

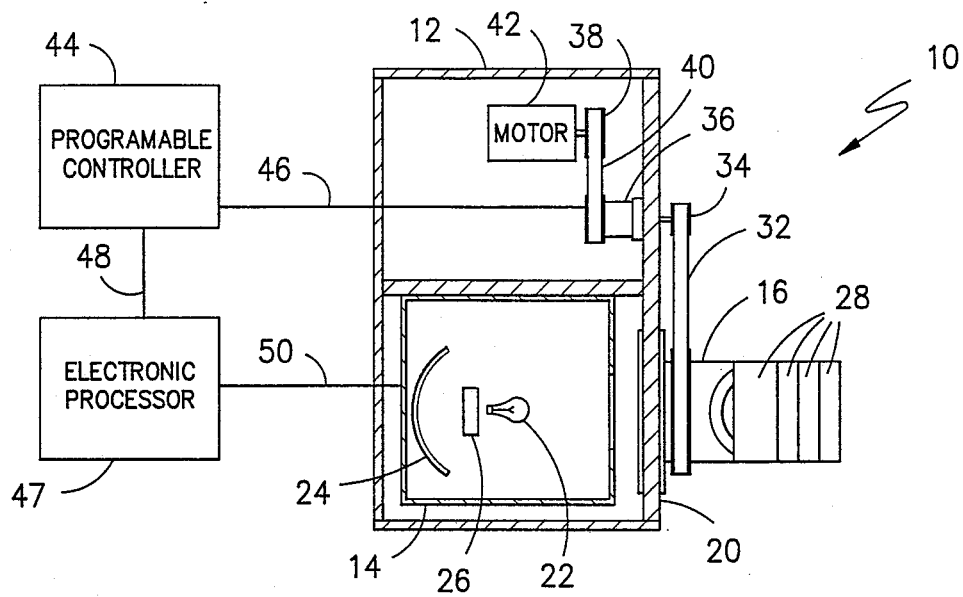
FIG. —3—
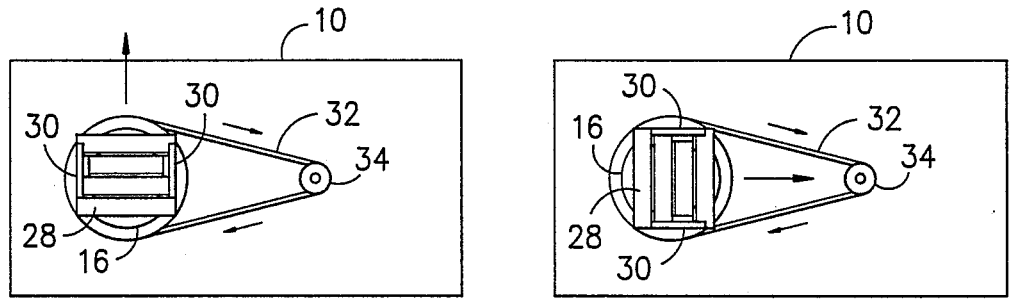
FIG. —4—    FIG. —5—
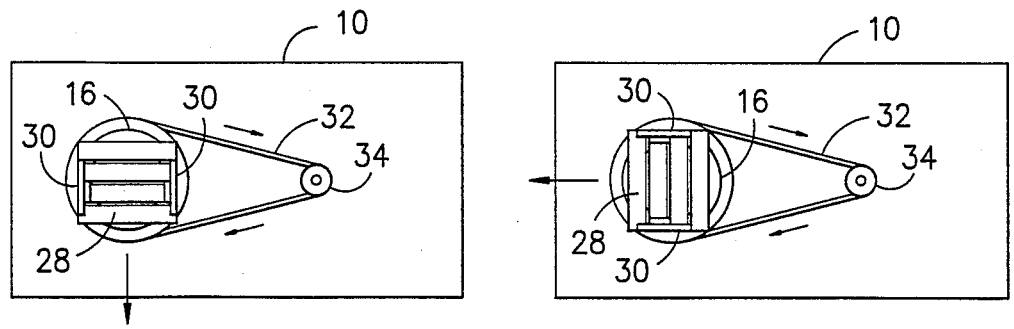
FIG. —6—    FIG. —7—

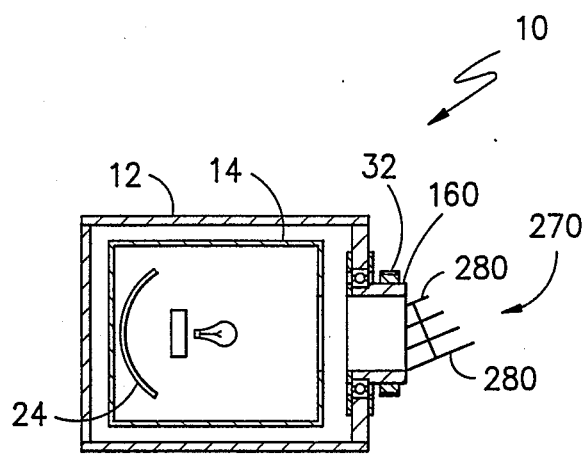
FIG. -8-

FABRIC PILE LAY DETECTOR USING MIRROR SYSTEM WITH MEANS TO ROTATE 360 DEGREES

This invention relates to a system to measure the pile angle of the upstanding fibers in a pile fabric to generate a signal which can be employed to provide a pile fabric with the desired pile angle.

As is well known in the industry, the angle of pile lay in a velvet or pile fabric affects many characteristics of the fabric such as softness, appearance, the overall aesthetic worth of the fabric and the customer's perception of shade and/or color. Prior to this invention, the angle of the pile has been determined by visual analysis which is dependent upon the perception of the viewer and does not reflect the overall standard for a desired style of pile fabric.

Therefore, it is an object of the invention to provide a system to automatically measure the pile angle of the fibers in a velvet or pile fabric without the use of an abnormal number of detectors.

Other objects and advantages of the invention will become readily apparent as the specification proceeds to describe the invention with reference to the accompanying drawings, in which:

FIG. 1 is an overall perspective view of the new and improved fabric pile lay detector;

FIG. 2 is a partially schematic view of the new detection system with a view of the detector taken on line 2—2 of FIG. 1.

FIG. 3 is a cross-section view taken on line 3—3 of FIG. 1.

FIGS. 4–7 are views of the light deflector mirrors in various positions, and

FIG. 8 is another embodiment of the pile lay detector in a view similar to FIG. 2.

The basic concept of the invention is directed to the use of a plurality of rotating mirrors to direct an infrared light signal onto a pile fabric and to redirect the directed, reflected light from the pile of the fabric to a light ray collector which directs the rays to a detector at a focal point.

Looking now to the drawings and especially FIGS. 1–3, the pile lay detector is denoted generally by the reference number 10. The detector consists basically of a housing 12, a conventional commercially available infrared sensing device 14 mounted in the housing and a truncated mirror support member 16 rotatably mounted in suitable bearings 18 in one side 20 of the housing 12. The sensing device 14 basically consists of an infra red light source 22, a parabolic reflector 24 and a infra red light detector 26 at the focal point of the reflector 24.

The mirror support member 16 supports the mirror structure 27 screwed or otherwise secured thereto. The mirror structure 27 consists of a plurality of substantially the same size mirrors 28 secured in side members 30 by any suitable means, such as screws. This complete structure 27 is mounted to the truncated mirror support member 16 for rotation therewith.

The rotation of the mirror structure 27 and the support member 16 is controlled by a timing belt 32 around the support member 16 and driven by the pulley 34. The pulley 34 is directly connected to a clutch-pulley arrangement 36 connected to a pulley 38 by another endless belt 40 driven continuously by the motor 42.

For reasons hereinafter explained a programmable controller 44 is connected by suitable means 46 to the clutch-pulley arrangement 36 and to the electronic processor 47 by suitable means 48. The electronic processor is electronically connected to the infra red detector 26 by suitable means represented by the line 50.

In the preferred form of the invention, the pile lay detector 10 is used to measure the pile angle of the pile fibers 52 of a carpet fabric 54 passed in operative relationship with and adjacent to by rolls 56 and 58 (FIG. 2). The detection of the pile angle of a pile carpet is merely preferred because it is obvious that the pile fiber angle of any pile fabric such as automotive, upholstery, etc. could be detected or measured, if desired.

OPERATION

It should be noted that the end of rotation support member 16 is cut at an angle of approximately 45° and the side members 30 of the mirror support are cut back at an angle of approximately $22\frac{1}{2}°$ from the vertical so the mirrors 28 when mounted on the support member 16 are inclined at an angle of approximately $22\frac{1}{2}°$ from the horizontal so that the infra red light beam from the source 22 will strike the pile surface at an angle of approximately 45° and be reflected back. The spacing between and the size of the mirrors 28 is so selected that one mirror does not overlap another to shadow the signals to and from the carpet 54.

Looking at FIGS. 2 & 3, the carpet 54 to be scanned is delivered from roll 56 to roll 58 so that the carpet passes in front of the detector or detectors 10 with the pile fibers 52 facing the detector 10. The motor 42 is running continuously while the controller 44 pulses the clutch-arrangement arrangement 36 every 15 seconds to engage same to rotate the mirror support 16 and consequently the mirrors 28 90° on each 15 second pulse of the clutch-arrangement. Looking at FIGS. 4–7 the mirror support member 16 rotates 90° each 15 seconds so that in one complete 60 minute cycle the member 16 and mirrors will rotate intermittently from the position in FIG. 4 to the position in FIG. 5 to the position in FIG. 6 to the position in FIG. 7 and back to the position of FIG. 4.

The infra red light source 22 continuously directs infra red light beams to the mirrors 28 which reflect the beam onto the pile 52 of the fabric 54 at an angle of approximately 45°. The light beam is then reflected back from the pile 52 to the mirror or mirrors 28 which direct the reflected beam to the parabolic reflector 24. The parabolic reflector 24 directs the reflected beam to its focal point where the detector 26 is located. The detector measures the intensity of the reflected infra red light beam and supplies the information to the electronic processor 47. The processor 47 compares the intensity of the reflected beam against a reference value and provides a signal to the controller 44. The controller stores the signals from the processor and subtracts the pulses from diametrically opposite positions of the rotated mirrors to provide a signal for a chart recorder. Therefore, for each detector 10 used there will be provided two lines on the chart from the chart recorder representing the signals from the controller that represent perpendicular positions of the mirrors 28. The two curves obtained from the chart represent the trend of pile lay of the fabric 54 and can be used to make adjustments in the processing of the carpet manufacture either upstream or downstream from the detector 10 to obtain the desired angle of pile lay in the fabric being produced.

The rotation of the mirrors 28 provides a multiplicity of signals that can be computed to provide an accurate picture of the pile lay of a particular pile fabric. By rotating the mirrors 28 it is not necessary to provide additional detectors to make the readings obtained by rotation of the mirrors.

FIG. 8 is a modification of the invention shown in FIGS. 1-7 in that the length of the rotating member 160 is less than the length of the rotating member 16. The end of the member 160 is cut off pendicular and the mirror structure 270 connected thereto. The mirrors 280 in the structure 270 from bottom to top are progressively shorter so that one mirror does not overshadow another mirror to prevent the return of the desired reflected signal. This modification provides a more compact detector to be used when space available is at a minimum.

Although the desired embodiments of the invention have been described, it is contemplated that changes may be made without detracting from the spirit or scope of the invention and it is desired that scope of the invention be limited only by the scope of the claims.

I claim:

1. A system to measure the pile lay of fibers on the face of a pile fabric comprising: means supplying a moving web of pile fabric, said pile fabric having a plurality of fibers on the face side thereof and an infra red light detector mounted adjacent the face side of said pile fabric, said detector having an infra red light source and a means to direct a light beam from said source onto the fibers of said pile fabrics and to direct reflected light beams from the fibers to a detecting means mounted in said detector, said means to direct the light beam from said source includes a rotating mounted mirror system connected to said light detector between said detector means and the face of the pile fabric and means to rotate said mirror system 360°.

2. The system of claim 1 wherein said mirror system is intermittently rotated in increments of 90°.

3. The system of claim 1 wherein said mirror system is intermittently rotated.

4. The system of claim 3 wherein said mirror system includes a plurality of mirrors mounted in a frame substantially parallel to one another.

5. The system of claim 4 wherein each of said mirrors is substantially the same size.

6. The system of claim 4 wherein said rotably mounted mirror system includes a hollow truncated rotably mounted cylinder with the truncated portion thereof cut an angle of approximately 45°.

7. The system of claim 4 wherein said rotably mounted mirror system includes a hollow rotably mounted cylinder.

8. The system of claim 7 wherein said mirror frame is mounted on the end of said rotably mounted cylinder adjacent the face side of the pile fabric.

9. The system of claim 8 wherein said mirrors are mounted one on top of another in the direction of movement of the pile fabric with each mirror from top to bottom being shorter in the axial direction of the rotably mounted cylinder than the next adjacent mirror.

10. A detector to measure the angle of pile lay of the fibers on the face side of a pile fabric comprising: a housing, an opening in one end of said housing, a cylindrical rotably mounted member mounted in said one end of said housing, an infra red light beam source in said housing, an infra red light beam detection means in said housing, a plurality of substantially parallel mirrors mounted on one end of said cylindrical member and spaced from one another and means operably associated with said housing and said cylindrical member to intermittently rotate said cylindrical member.

11. The detector of claim 10 wherein said one end of said cylindrical member is at an angle of approximately 45°.

12. The detector of claim 10 wherein said one end of said cylindrical member is cut substantially perpendicular to its axis.

13. The detection of claim 11 wherein each of said mirrors is approximately the same size.

14. The detector of claim 13 wherein said cylindrical member is driven in 90° increments.

15. The detector of claim 14 wherein said means to intermittently rotate said cylindrical member is a belt-clutch system driven by a continuously running motor which rotates said cylindrical member when the belt and clutch system is engaged.

16. The detector of claim 12 wherein said mirrors from top to bottom are shorter in the axial direction of said cylindrical member.

17. The detector of claim 16 wherein said cylindrical member is driven in 90° increments.

18. The detector of claim 17 wherein said means to intermittently rotate said cylindrical member is a belt-clutch system driven by a continuously running motor which rotates said cylindrical member when the belt and clutch system is engaged.

19. A method of detecting the pile lay of the fibers on the face side of a pile fabric comprising the steps of: running a pile fabric past an infra red light beam detector with its pile side towards said detector, directing an infra red light beam towards the pile fabric at an angle of approximately 45° thereto, detecting the infra ray light beam reflected by the pile fabric, rotating the detector intermittently through 360° to change the point of impact of the infra red light beam on the face side of the pile fabric, detecting the reflected infra red light beams from the different points of impact and automatically measuring the data obtained from the reflected infra red light beams to provide information to determine the pile lay of the fabric.

20. The method of claim 19 wherein the point of impact is indexed in increments of 90°.

* * * * *